Dec. 24, 1957
P. F. HAYNER
2,817,359
HYDRAULIC VALVE
Filed March 1, 1954
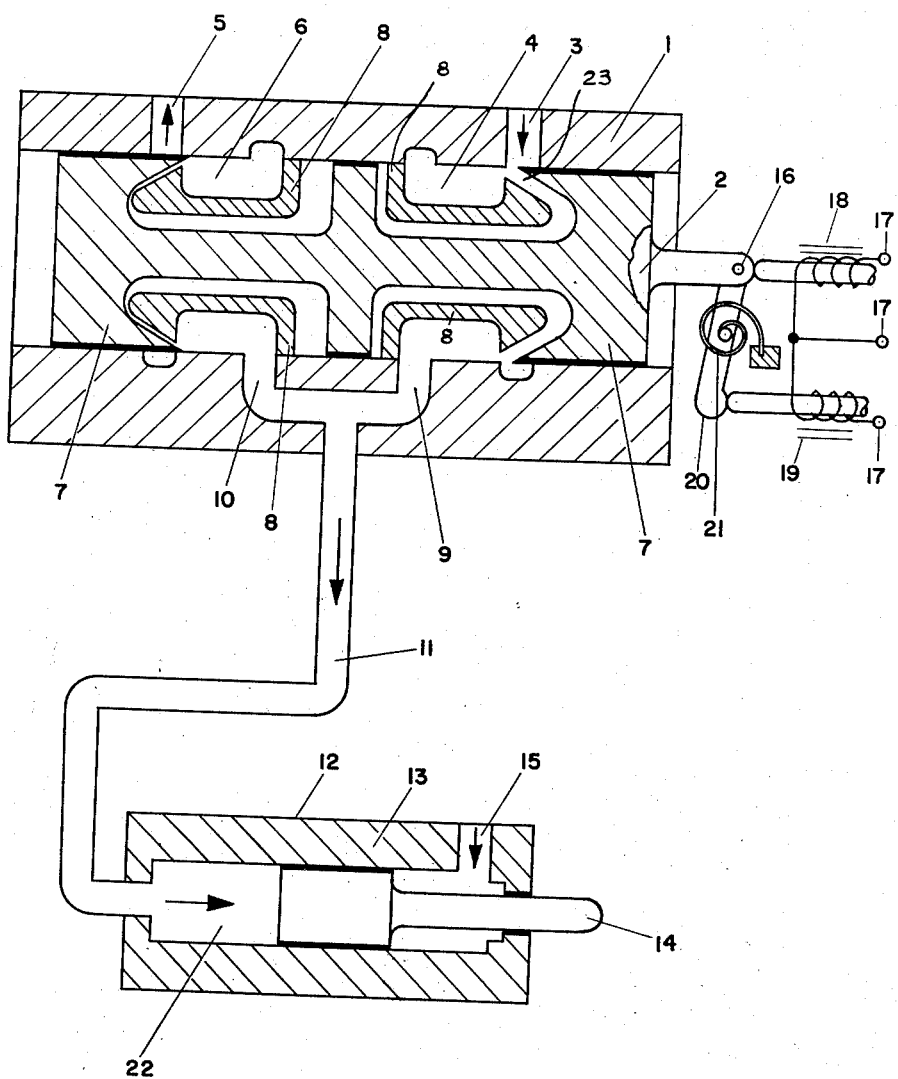
FIG. I
Paul F. Hayner
*INVENTOR.*
BY 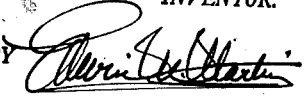
ATTORNEY

United States Patent Office 2,817,359
Patented Dec. 24, 1957

2,817,359

HYDRAULIC VALVE

Paul F. Hayner, Pelham, N. H., assignor, by mesne assignments, to Sanders Associates, Inc., Nashua, N. H., a corporation of Delaware Application March 1, 1954, Serial No. 413,408

5 Claims. (Cl. 137—620)

This invention relates to the art of hydraulic control. More particularly, this invention relates to hydraulic amplifier valves as used in the servo systems.

The hydraulic amplifier valve converts a small input signal into a flow of fluid under pressure. The term "fluid," as used herein, includes gaseous and liquid substances. In a single-stage unit a small displacement of a piston in a cylinder permits a flow of fluid under pressure to control an output actuating device.

In the prior art, valves of the type described have been subject to reaction forces upon the displacement of the piston. Since the piston may be displaced by a relatively small input force, a small force tending to retard its action materially decreases the sensitivity and hence the amplification of the valve.

It is therefore an object of this invention to provide an improved hydraulic amplifier valve with an increased sensitivity to a control force.

Other objects of this invention will be apparent from the following description of a typical embodiment thereof, taken in connection with the accompanying drawings. In accordance with this invention there is provided a hydraulic valve adapted to control a source of fluid under pressure, comprising a cylinder and a piston in the cylinder. Input port means are provided in the cylinder body for connecting the source to the cylinder to permit the flow of the hydraulic fluid therethrough. Control port means are also provided in the cylinder body and connected to the cylinder to provide passages for the fluid flow to and from the valve. In addition, means are provided for moving the piston selectively to effect interconnection of the input and control port means. Reaction force shielding means are disposed in the cylinder adjacent the input and control port means and affixed to the body for shielding the exposed surfaces of the piston from reaction forces tending to act in opposition to the desired direction of piston displacement. These reaction forces are developed by differential pressures produced by differences in velocities of the fluid flow.

In the accompanying drawing, Fig. 1 is a cross-sectional view of a hydraulic amplifier valve embodying this invention and shown connected to an output actuating device.

Referring particularly to the drawings, the casing 1 embodies a cylinder surrounding a reciprocating pilot piston 2. A pressure port 3 is adapted to connect a source of fluid under pressure to a chamber 4 formed by a restricted portion of piston 2 within the cylinder. An exhaust port 5 is adapted to permit the fluid to return to the source through a second chamber 6. A portion 7 of the piston 2 is shown in cross-section to illustrate the undercutting of the piston lands. Compensating guards 8 are firmly attached to the casing 1 and may be integrally formed therewith. Output ports 9 and 10 connect chambers 4 and 6, respectively, to an output control line 11, which is connected to an output actuating device 12. Casing 13 of the device 12 comprises a cylinder surrounding the piston 14. A pressure port 15 is connected to the source of fluid.

An input electrical signal is coupled through terminals 17 to energize a torque motor comprising solenoids 18 and 19, armature 20 and torsion spring 21 to control the displacement of the piston 2 through the coupling link 16. The piston 2 controls ports 3 and 5 selectively to apply pressure to or evacuate output control line 11 to displace output piston 14.

When the piston 2 is displaced to the right fluid flows through pressure port 3, through the restricted opening between the walls of port 3 and the piston 2, port 9 and control line 11 to actuate the piston 14 to the right. When the piston 2 is displaced to the left, the pressure port 3 is occluded, and the exhaust port 5 is opened to evacuate the chamber 22 of the output actuator 12 through control line 11, port 10 and chamber 6 and permits output piston 14 to be displaced to the left.

By Bernoulli's principle, the flow of fluid through the restricted openings between pressure port 3, exhaust port 5 and piston 2 has a lesser transverse pressure relative to the fluid flow through ports 9 and 10. Thus, when the piston 2 is displaced to the right, the pressure tending to displace the piston 2 to the right due to the flow of fluid through port 3 is less than the pressure tending to displace the piston to the left due to the flow of the fluid through port 9. Similarly, a force tending to displace the piston 2 in opposition to the desired direction of displacement in developed when the exhaust port 5 is opened.

In the prior art the differential pressures thus obtained act on the entire areas of the exposed surfaces of the piston lands. The guards 8 embodied in the present invention restrict the surface areas in contact with the differential pressures and effect a sharp reduction in the forces produced thereby that tend to counteract the desired displacement of the piston. The opening between the right land of the piston 2 (as shown) and the pressure port 3 is very small, producing a jet stream of fluid into the chamber 4. As stated above, fluid pressure transverse to the direction of flow is inversely proportional to its velocity. It is to be noted that the fluid between the guard 8 and piston 2 is static. Thus, whatever pressure relative to the casing 1 appears at the opening of the passageway 3 into the chamber 4 is transmitted in all directions through the static fluid to the surfaces of the piston 2. The guard is connected as shown to the casing 1; therefore, the pressure acting between the casing 1 and the surfaces of the piston 2 is everywhere the same.

The differential pressures due to the variations in velocity of the fluid flowing in chamber 4 are distributed between the guards 8 and casing 1. Thus, the guards 8 serve to compensate for the differential pressures by isolating them from the surfaces of the piston 2. These pressures previously produced reaction forces acting in opposition to the desired travel of the piston 2. By virtue of the structure of the present invention, they are dissipated between the guards 8 and the casing 1 and rendered ineffective.

The sensitivity of operation and the greater power amplification made possible by the present invention greatly enhances the utility of the hydraulic amplifier valve. The advantages of hydraulic amplifier valves over other mechanisms may now be more fully realized.

While there has been hereinbefore described what is at present considered a preferred embodiment of the invention, it will be apparent that many and various changes and modifications may be made with respect to the embodiment illustrated without departing from the spirit of the invention. It will be understood, therefore, that all those changes and modifications as fall fairly within the scope of the present invention, as defined in the appended

What is claimed is:

1. A hydraulic valve adapted to control a source of fluid under pressure, comprising: a valve body having a cylinder therein; a piston in said cylinder; input port means in said body adapted for connecting said source to said cylinder to permit the flow of said fluid therethrough; control port means in said body connected to said cylinder to provide passages for said fluid flow to and from said valve; means for moving said piston selectively to effect interconnection of said input and control port means; and reaction-force, shielding means disposed within said cylinder adjacent said input and control port means and affixed to said body for shielding the exposed surfaces of said piston from reaction forces tending to act in opposition to the desired direction of piston displacement, said forces being developed by differential pressures produced by differences in velocities of said fluid flow.

2. A hydraulic valve adapted to control a source of fluid under pressure, comprising: a valve body having a cylinder therein; a piston in said cylinder; input port means in said body adapted for connecting said source to said cylinder to permit the flow of said fluid therethrough; control port means in said body connected to said cylinder to provide passages for said fluid flow to and from said valve; means for moving said piston selectively to effect interconnection of said input and control port means; and solid, annular, reaction-force, shielding means disposed within said cylinder adjacent said input and control port means and circumferentially affixed to said body for shielding the exposed surfaces of said piston from reaction forces tending to act in opposition to the desired direction of piston displacement, said forces being developed by differential pressures produced by differences in velocities of said fluid flow.

3. A hydraulic valve adapted to control a source of fluid under pressure, comprising: a valve body having a cylinder therein; a piston in said cylinder; input port means in said body adapted for connecting said source to said cylinder to permit the flow of said fluid therethrough; control port means in said body connected to said cylinder to provide passages for said fluid flow to and from said valve, said piston having a pair of restricted portions for interconnecting said input and control port means; means for moving said piston selectively to position said restricted portion to effect interconnection of said input and control port means; and reaction-force, shielding means disposed within said cylinder adjacent said input and control port means, affixed to said body and extending into said restricted portions for shielding the exposed surfaces of said piston from reaction forces tending to act in opposition to the desired direction of piston displacement, said forces being developed by differential pressures produced by differences in velocities of said fluid flow.

4. A hydraulic valve adapted to control a source of fluid under pressure, comprising: a valve body having a cylinder therein; a piston in said cylinder; input port means in said body adapted for connecting said source to said cylinder to permit the flow of said fluid therethrough; control port means in said body connected to said cylinder to provide passages for said fluid flow to and from said valve; means for moving said piston selectively to effect interconnection of said input and control port means; and reaction-force, shielding means disposed within said cylinder adjacent said input and control port means, affixed to said body and adapted to provide a reservoir to preclude that fluid from flowing in contact with the exposed effective surfaces of said piston for shielding said exposed surfaces from reaction forces tending to act in opposition to the desired direction of piston displacement, said forces being developed by differential pressures produced by differences in velocities of said fluid flow.

5. A hydraulic valve adapted to control a source of fluid under pressure, comprising: a valve body having a cylinder therein; a piston in said cylinder; input port means in said body adapted for connecting said source to said cylinder to permit the flow of said fluid therethrough; control port means in said body connected to said cylinder to provide passages for said fluid flow to and from said valve; means for moving said piston selectively to effect interconnection of said input and control port means, said piston having a pair of restricted portions for interconnecting said input and control port means; and cylindrical, metallic, reaction-force guards, disposed within said cylinder adjacent said input and control port means and affixed to said body surrounding said restricted portions, said guards being annularly so flanged as to provide a static pool of fluid in contact with selected exposed piston surfaces for shielding said exposed surfaces from reaction forces tending to act in opposition to the desired direction of piston displacement, said forces being developed by differential pressures produced by differences in velocities of said fluid flow.

References Cited in the file of this patent

UNITED STATES PATENTS

| 1,123,273 | Gregersen | Jan. 5, 1915 |
| 2,621,676 | Loft | Dec. 16, 1952 |

FOREIGN PATENTS

| 589,937 | Germany | 1932 |